(12) United States Patent
Hetze et al.

(10) Patent No.: US 6,289,630 B1
(45) Date of Patent: Sep. 18, 2001

(54) DEVICE TO KEEP FLOWERS FRESH

(76) Inventors: Peter Hetze, Hauptstrasse 51, 2102 Bisamberg (AT); Robert Janecka, Favoritenstrsse 61-63, 1100 Wien (AT)

( * ) Notice: Subject to any disclaimer, the term of this patent is extended or adjusted under 35 U.S.C. 154(b) by 0 days.

(21) Appl. No.: 09/254,507

(22) PCT Filed: Sep. 5, 1996

(86) PCT No.: PCT/AT96/00159

§ 371 Date: Jun. 25, 1999

§ 102(e) Date: Jun. 25, 1999

(87) PCT Pub. No.: WO98/09504

PCT Pub. Date: Mar. 12, 1998

(51) Int. Cl.⁷ ........................................ A01G 5/00
(52) U.S. Cl. .............................. 47/41.01; 47/48.5
(58) Field of Search ............... 47/41.01, 48.5, 47/62 E (56) References Cited

U.S. PATENT DOCUMENTS

| | | | |
|---|---|---|---|
| 2,870,574 | * | 1/1959 | Sheridan .................. 47/62 E |
| 3,243,336 | * | 3/1966 | Auge ........................ 47/41.01 |
| 3,304,653 | * | 2/1967 | Zadarnowski . | |
| 3,319,379 | * | 5/1967 | Groeber et al. . | |
| 3,842,539 | | 10/1974 | Sacalis . | |
| 4,037,361 | * | 7/1977 | Murphy et al. .............. 47/48.5 |
| 4,103,457 | * | 8/1978 | Carlise ........................ 47/41.11 |
| 4,167,832 | | 9/1979 | Zetterquist et al. . | |
| 4,776,130 | * | 10/1988 | West et al. .................... 47/48.5 |
| 5,212,904 | * | 5/1993 | Green et al. .................. 47/48.5 |
| 5,533,300 | * | 7/1996 | Kesler .......................... 47/48.5 |
| 5,564,225 | * | 10/1996 | Quiding et al. .............. 47/58.1 |
| 5,975,797 | * | 11/1999 | Thomas et al. .......... 47/487.5 X |
| 6,052,942 | * | 4/2000 | Chu ............................ 47/48.5 |
| 6,073,392 | * | 6/2000 | Resit .......................... 47/48.5 |

FOREIGN PATENT DOCUMENTS

| | | |
|---|---|---|
| 38 09 121 A | 10/1989 | (DE) . |
| 2 500 287 A | 8/1982 | (FR) . |
| 58013502 A | * 1/1983 | (JP) . |
| WO 89/07392 A | 8/1989 | (WO) . |

* cited by examiner

Primary Examiner—Charles T. Jordan
Assistant Examiner—Kevin Jakel
(74) Attorney, Agent, or Firm—Henry M. Feiereisen; Ursula B. Day (57) ABSTRACT

Device to keep cut flowers fresh for admixing nutrients to the keep fresh liquid, with a carrier for the nutrient being provided by which the nutrients are dispensed directly to the keep-fresh liquid, wherein the blade-shaped, stem-shaped, stalk-shaped or rod-shaped carrier (1) is provided with a container (2) which receives and releases the nutrients and has walls which are permeable at least in certain areas.

17 Claims, 7 Drawing Sheets

DEVICE TO KEEP FLOWERS FRESH

BACKGROUND OF THE INVENTION

The invention relates to a device for retaining the freshness of cut flowers, with the device adding nutrients to the keep-fresh liquid wherein a carrier is provided for the nutrients for directly delivering the nutrients to the keep-fresh liquid.

To date, cut flowers are usually kept fresh by regularly changing the keep-fresh liquid, normally water. While for certain types of flowers, there are fertilizers available that can be added to the keep-fresh liquid; whereby then only water may be refilled in order to realize a good nutrients efficacy. Such an addition of nutrients is unpleasant to handle, and oftentimes, the appropriate fertilizer is not available when fresh flowers are presented, for example by a visitor.

The configuration of the above-stated type and known from the DE-OS 38 09 121, includes small paper rolls that are soaked with preserving chemicals and integrated or placed in the bound bouquet. These small paper rolls may also have a color that matches the bouquet. The conventional configuration suffers the drawback that the small paper rolls may already release the chemicals when being placed into the bouquet, whereby the moist or wet stems, as typical in cut flowers, are directly exposed to the chemicals in relatively high concentration, which may even lead to damage of the plant tissue in the contact area. The extracted fertilizer substances are possibly also released into the surrounding paper which soaks up the liquid so that the fertilizer substances are no longer available for fertilization of the keep-fresh water.

U.S. Pat. No. 4,167,832 discloses a prepared banderole with bactericidal surface-active and/or nutrient-containing active substances. It is not possible to directly integrate this carrier into the bouquet, but is wrapped around the bouquet and releases, as already described above, the active substances prematurely in some cases directly onto the moist flower stem, thereby causing damage thereof. Furthermore, in many cases, banderoles wrapped around the flower bouquet are oftentimes removed when watering the plants, so that in this case the banderole for fertilization of the keep-fresh water would not be available.

U.S. Pat. No. 3,842,539 is directed to a container which is intended for placement onto the flower stems and contains an ion exchanger resin which is separated from the actual flower stem by a gauze layer. This ion exchange resin reduces the physical blocking of the water-conducting tissue and thereby assists to keep the flowers in fresh condition. In particular, the blocking of the lower end of the flower stem as a result of drying out or rotting is delayed.

SUMMARY OF THE INVENTION

It is now an object of the invention to provide a device of the above-stated type which, on the one hand, realizes a reliable release of fertilizer substances into the keep-fresh water, and, on the other hand, allows this fertilizer carrier to be easily integrated into the flower bouquet, without damage to moist flower stems even when present.

In accordance with the invention, this object is attained by providing the blade-shaped, stem-shaped, stalk-shaped or rod-shaped carrier with a container which receives and releases the nutrients and has walls that are permeable at least in certain areas. In this manner, the container keeps the stored substances away from the flower stems, thereby avoiding an unwanted and premature extraction of the substances. Such a device can be integrated directly with the flower bouquet, and after placement of the flower bouquet in water, the respective nutrients are released into the keep-fresh liquid since keep-fresh liquid seeps into the container from outside and extracts the nutrients contained in the container. Thus, a completely ready-made product is provided which does not require further manipulations.

A particularly simple manufacture can be realized when producing the nutrient container as a separate part which is attachable to the blade-shaped, stem-shaped, stalk-shaped or rod-shaped carrier. Thus, it is possible to provide different nutrient containers to uniform upper parts, depending on the type of flowers to be fertilized, since different flower types prefer also different fertilizers, as is generally known. In order to avoid, on the one hand, an inadvertent separation of nutrients, and, on the other hand, permit also use of liquid preparations, the container walls may be formed for permeability with perforations which are covered prior to placement into the keep-fresh liquid. In a particularly simple manner, a cylindrical or prismatic container with perforations disposed in the jacket, the covering may be realized by an axially shiftable sleeve or detachable film. This provides the option to only partially clear the perforations, either by displacing the shiftable sleeve only partially in axial direction, or by removing the detachable film only from certain areas of the perforated jacket. When the nutrient preparations are in solid form or of a type that is not water-soluble, the covering may be made of a water-soluble material or of a material which is decomposable in water, whereby the material for the covering is preferably a material with time-delayed solubility or decomposition. This has the advantage that after immersion of the container into the keep-fresh liquid, the perforations are automatically cleared, so that the fertilization of the flowers occurs automatically, without the need for further manipulations. The time delay has the additional advantage that during temporary placement of the flower bouquet in water, the nutrients will not yet be released, but only after a corresponding time in the vase in which the flower bouquet is ultimately retained. The nutrients provided in the container may also be imbedded in a structure from which they are released in a time-delayed manner so as to prevent an excessive initial concentration of nutrients in the nutritive solution and also to prevent a very rapid consumption of the nutrients. A particularly controlled release of the nutrients into the keep-fresh liquid can be realized when the nutrients are stored in a container having walls which are made semi-permeable, at least in certain areas, and have openings through which nutrient solution is dispensed into the keep-fresh liquid by the effect of osmosis. Depending on the concentration of the nutrient salts, liquid is aspirated through the semi-permeable wall by the effect of osmosis and a nutrient/liquid mixture is introduced in the keep-fresh liquid via the openings. This is necessarily controlled by the elevated inner pressure in the container as a consequence of osmosis.

Additionally, a physiologically inert propellant, for example, an agent which releases $CO_2$, may be added to the nutrients in order to realize a reliable and uniform release of nutrients into the nutrient solution. Such a propellant can also serve to expel the nutrients quickly from the container and to evenly distribute them in the container. Moreover, the propellant may also provide an additional growth-promoting effect. In particularly simple fashion, the container may be formed from a flexible permeable material, e.g., paper, nonwoven, a perforated film or the like, which is attached to or wrapped around the carrier. This creates a simple configuration which is inexpensive to produce as it does not require particularly shaped carriers. To avoid a separation of the container from the carrier, the carrier may be provided in the area of the container with grooves, flattened areas or the like.

According to another embodiment, the container may be formed as a cylinder having an upper surface formed as a piston which is connected to the carrier, with the carrier preferably forming the piston rod. This enables dispensing of the nutrients as a whole or in partial amounts into the keep-fresh liquid, depending on the distance the piston is pushed into the cylinder, whereby the cylindrically or prismatically configured container may have formed at its lower end the discharge opening or openings, with the container being cut at its lower end obliquely with respect to the longitudinal axis or has a serrated or corrugated boundary. Thus, it is possible to empty the container while being supported on the floor, by pressing the carrier downwards to thereby move the piston downwards so that the nutrients are expelled from the container. In order to permit independent exchange of the carrier and the container, the container may simply have at its upper surface a snap-on lid in which the rod-like carrier is inserted or guided in a longitudinal direction.

Finally, the carrier may have at its upper end a receptacle for insertion of a dedication carrier, a greeting card, a figurine, a gift container, a perfume flask, twinkle candles or the like, so that the carrier further assumes the function of support of personal items. Such a configuration is not shown in any of the conventional designs, which are neither conceived nor designed for the stated dual effect.

BRIEF DESCRIPTION OF THE DRAWING

Various exemplified embodiments of the subject matter of the invention are shown in the drawing.

DETAILED DESCRIPTION OF PREFERRED EMBODIMENTS

Figure 1:
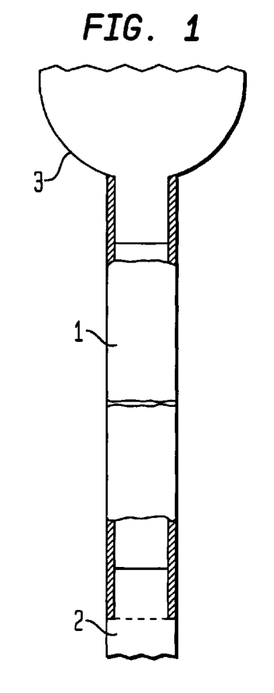
FIG. 1 shows schematically the complete design of the device, with a dedication sheet or the like placed at the upper end.

Provided at the lower end of a blade-shaped or stem-shaped carrier 1 is a container 2 filled with nutrients. Inserted at the upper end of the blade-shaped or stem-shaped carrier is a greeting card or another form of dedication 3.

Figure 3:
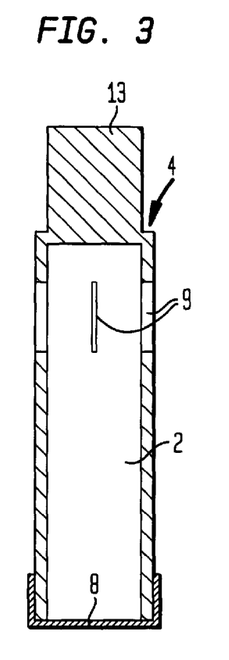
FIG. 3 shows a view of another variation of the container similar to FIG. 2.
Figure 4:
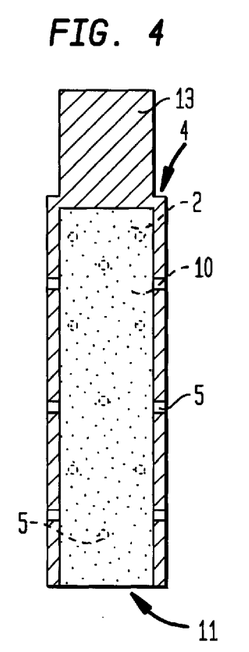
FIG. 4 illustrates a container according to the invention, which is filled with solid material.
Figure 5:
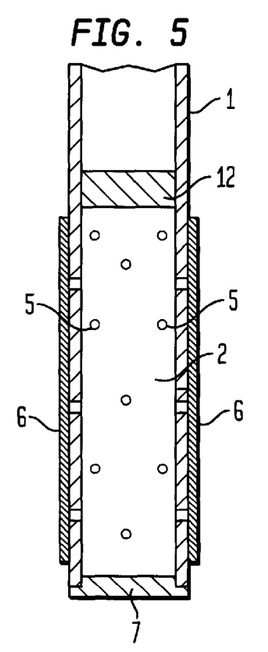
FIG. 5 shows another variation, with the blade-shaped, stem-shaped, stalk-shaped or rod-shaped carrier having a lower end directly formed as container.

The container 2 may, as shown in FIGS. 1 to 4, either constitute a part separate from the blade-shaped, stem-shaped, stalk-shaped or rod-shaped carrier 1, and insertable into the interior of the lower end of the mentioned carrier 1, or, as shown in FIG. 5, may be formed as an area of the carrier, which area is separated from the remaining carrier 1.

In the embodiments of FIGS. 1 to 4, the container 2 is provided in the upper part with a step-like neck 4 which has an outer diameter corresponding to the inner diameter of the lower area of the blade-shaped, stem-shaped, stalk-shaped or rod-shaped carrier 1, thereby realizing a frictional engagement between both components.

Figure 2:
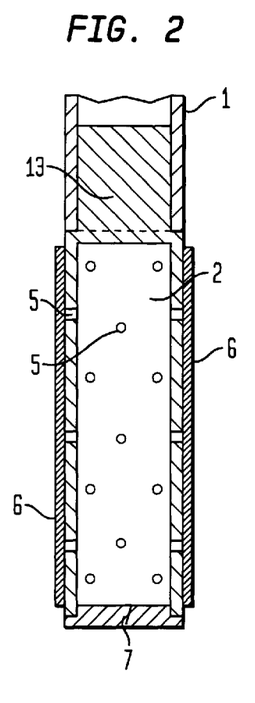
FIG. 2 shows a section, on an enlarged scale, through the lower end of the device, with a container according to the invention being attached at one end.

The container of FIG. 2 is provided in the area of its jacket with openings 5 which are closed by a covering 6. In the event of a cylindrical or prismatic container, the covering 6 is either shiftable in axial direction of the carrier 1, or this covering may be designed as a detachable film. The lower end of the container 2 is closed by a plug 7. When a nutrient solution is used in which the nutrients are not dissolved in a non-water-miscible solution, the covering 6 may be made from a material which is water-soluble or decomposable in water.

The variation of FIG. 3 differs therefrom by closing the lower open end of the container 2 through a semi-permeable membrane 8, and by providing the walls of container 2 with through-slots 9 having edges which normally abut one another to prevent a discharge of the liquids. As a consequence of osmotic conditions, the keep-fresh liquid, normally water, is aspirated into the interior of the container through the semi-permeable membrane 8, thereby increasing the pressure inside the container to such an extent that the slots 9 are expanded, so as to create openings through which the nutrient solution can enter into the surrounding liquid. Thus, a controlled, continuous supply of nutrient solution is realized.

In the variation of FIG. 4, the container is configured in the same manner as in FIG. 2, but the nutrients are absorbed in a solid carrier body 10 which slowly decomposes in water to thereby release the contained nutrients into the keep-fresh liquid. The release of the liquid can be effected either through the lower open end 11 of the container 2 or, also through the openings 5 in the jacket.

Although not shown, it is certainly possible to directly attach a solid carrier for the nutrients at the blade-shaped, stem-shaped, stalk-shaped or rod-shaped carrier 1, such that the provision of a separate container 2 would be redundant. Thus, the control of nutrient release would then be effected by the composition of the carrier.

The variation of FIG. 5 has a configuration corresponding to the one shown in FIG. 2, however, the container 2 is designed as an integral part of the blade-shaped, stem-shaped, stalk-shaped or rod-shaped carrier 1, so that this container 2 forms the lower end of the carrier 1. The interior space of the carrier 1 is sealed by a plug 12 from the container 2. This seal is not provided in the variations of FIGS. 1 to 4 because the upper end 13 of the container 2, which upper end has the neck 4 provided on its outside, assumes by itself the seal with respect to the inside of the blade 1.

Figure 6:
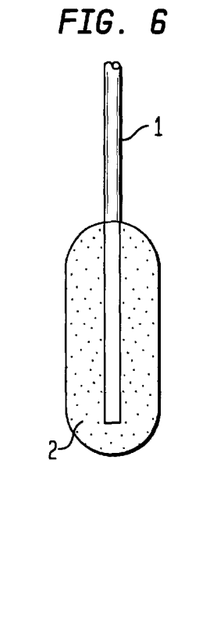
FIG. 6 illustrates another variation of the container attached to the carrier.
Figure 7:
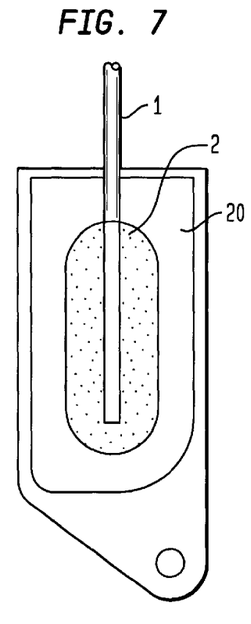
FIG. 7 shows the embodiment of FIG. 6 with pertaining packaging.

The exemplified embodiment of FIGS. 6 and 7 shows a container 2 which is attached to and tightly surrounds the carrier 1. The container 2 is permeable to liquid and thus permits the discharge of nutrients into the liquid. For storage or transport, the container 2 is wrapped by a packaging 20, for example a deep-drawn film.

Figure 8:
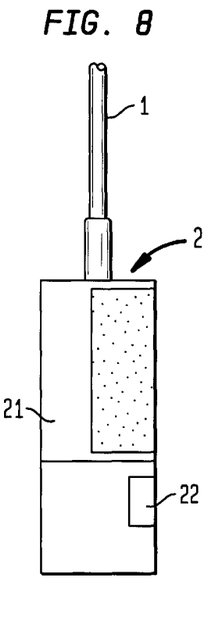
FIG. 8 is a side view of another exemplified variation of the container.
Figure 9:
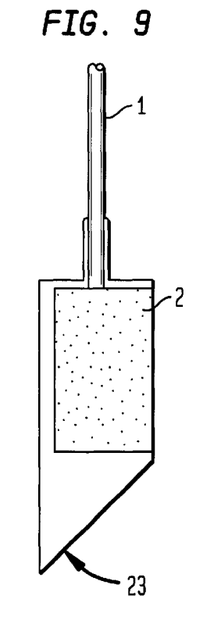
FIG. 9 shows also a side view of a modified embodiment.

FIG. 8 shows a variation in which the container 2 attached to the carrier 1 is only partially perforated, whereas the remaining part of the container is surrounded by a solid wall 21. For improved entry of liquid, an opening 22 is provided in the area of the jacket so as to allow entry of liquid to the nutrients also from the lower end. FIG. 9 is a similar configuration, however with a different shaped solid container area 21 and entry opening 23.

Figure 10:
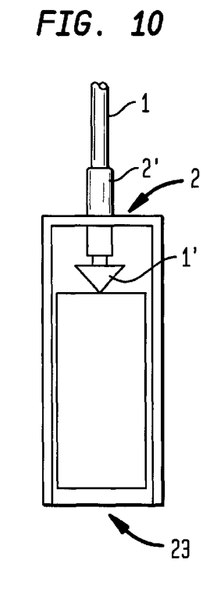
FIG. 10 shows a further embodiment of the device according to the invention in which the nutrients are received in a tight outer container and dispensed from the container by means of the carrier acting as a piston rod.

FIG. 10 shows a variation in which the nutrients in the container 2 are provided in a separate packaging which can be pierced by a tip 1', located at the lower end of the carrier 1, when the carrier 1 is pushed into the container through a slideway sleeve 2' located in the lid of the container 2. The content of the additional packaging is then emptied via the opening 23 into the interior of the flower vase.

Figure 11:
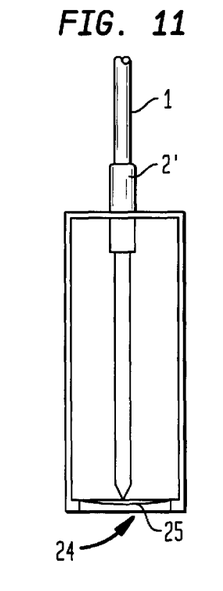
FIG. 11 illustrates a variation in which the container containing the nutrients in liquid form is adapted for perforation by a tip at the end of the carrier rod shiftable in the outer container.

According to FIG. 11, the carrier 1 is likewise guided for longitudinal displacement in the sleeve 2' of the container 2, but is provided at the lower end with a piston 25 by which the nutrients in the container 2 are being pushed through the opening 24 into the vase.

Figure 12:
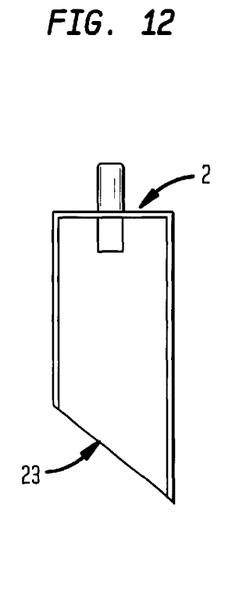
FIGS. 12 and 13 show modifications of the shape of the outer container of FIG. 10.
Figure 13:
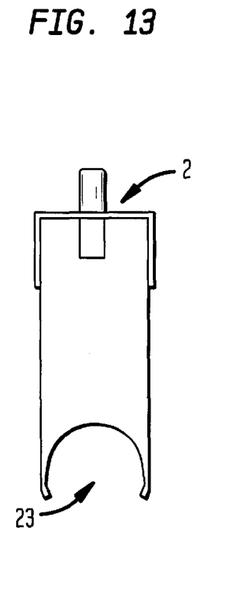

FIGS. 12 and 13 show other embodiments of the outer container 2 for the variations according to FIGS. 10 and 11.

Figure 14:
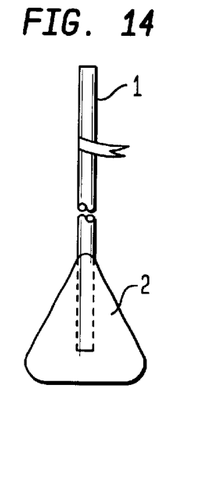
FIG. 14 shows a basically different embodiment in which the nutrients are provided in a flexible, permeable container secured to a liquid-immersed part of the carrier.
Figure 15:
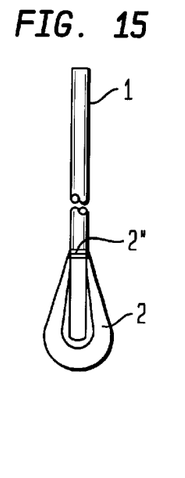
FIG. 15 is a side view of the design of FIG. 14.

FIGS. 14 and 15 show a particularly simple variation in which the container 2 is formed as a small bag which is wrapped around the lower end of the carrier 1 and fastened by means of a twine 2" or the like.

Figure 16:
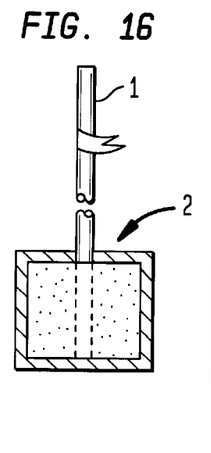
FIG. 16 illustrates a modification of the design of FIG. 14, with the carrier projecting into the interior of the container.

FIG. 16 illustrates a variation in which the container 2 is placed directly onto the lower end of the carrier 1, i.e. the carrier extends into the small bag.

Figure 17:
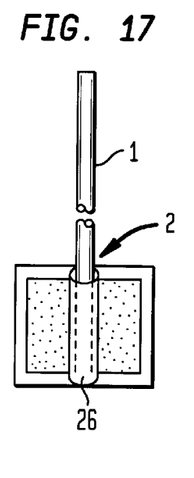
FIG. 17 shows a variation similar to FIG. 16, with the carrier being secured laterally via a bracket.
Figure 18:
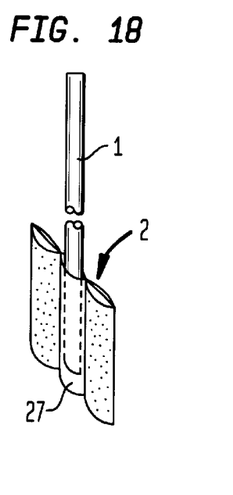
FIG. 18 shows a further modification of the design of FIG. 16.

In FIG. 17, the container 2 formed as small bag is secured to the carrier 1 by means of a bracket 26, and in FIG. 18 is inserted in a hose-like part 27 between two container chambers.

Figure 19:
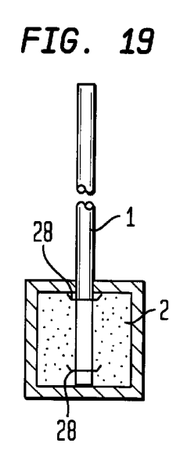
FIG. 19 shows a further possibility of attachment of the container to the carrier.

In the variation of FIG. 19, the securement of the container 2 formed as small bag to the carrier 1 is effected by means of clamps 28.

Figure 20:
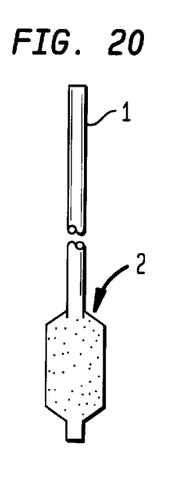
FIG. 20 illustrates schematically, a further container design in a disposition secured to the carrier.

FIG. 20 shows a design, in which the lowermost part of the carrier 1 itself is formed as container 2.

Figure 21:
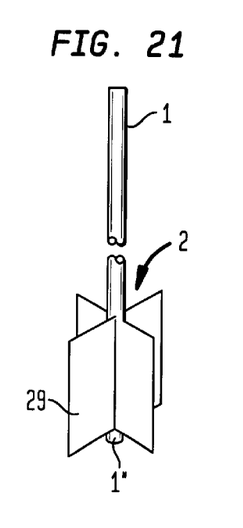
FIG. 21 shows a container configuration in the form of an arrow end.
Figure 22:
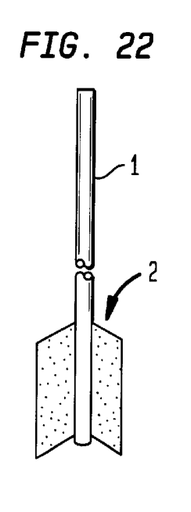
FIG. 22 shows an embodiment analogous to FIG. 21, however with only two wings.
Figure 23:
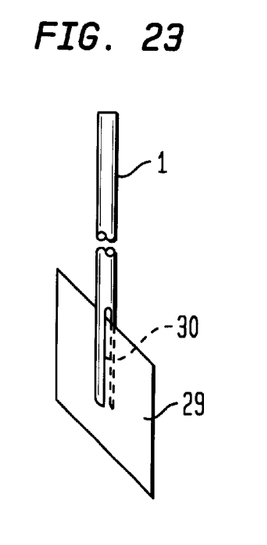
FIG. 23 shows the attachment of the wings of FIG. 21.
Figure 24:
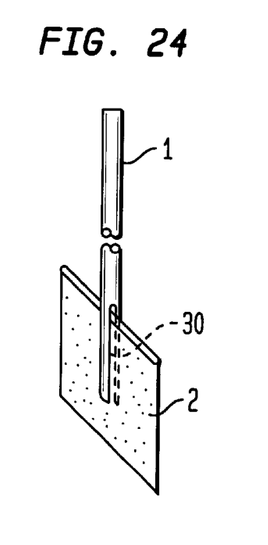
FIG. 24 shows in more detail the attachment of the wings of FIG. 22.

FIG. 21 to FIG. 24 illustrate different variations in which the carrier 1 is provided at its lower end with a slot 30, or two slots in crossing disposition, for insertion of the container 2 for the nutrients. The container may be of card-like design, as indicated at 29, or a flat small bag as shown in FIG. 24. In FIG. 21, the cards are inserted like an arrow end, with the lowermost end 1" of the container 1 acting as a spacer with respect to the bottom of the vase.

Figure 25:
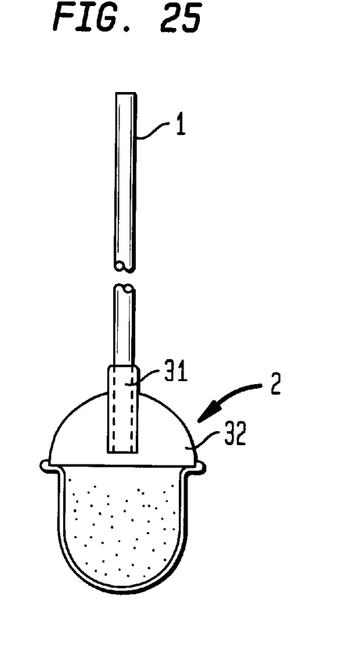
FIGS. 25 to 27 show different variations of snap-on lids attached to the lower end of the carrier for cooperation with containers of different shapes.
Figure 26:
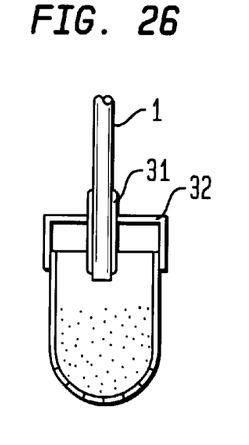
Figure 27:
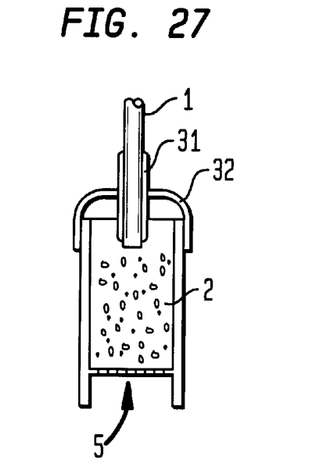

In the variations of FIGS. 25 and 27, the container 2 has a lid 32 which is attached like a snap-on lid onto the container 2. Centrally placed in the lid 32 is a sleeve 31 in which the carrier 1 is snugly fitted. The container 2 may be differently configured, for example, it may be perforated throughout (FIG. 25), or provided with passages only in the lower region (FIG. 26), or configured as a cylindrical container with a bottom that is inwardly offset backwards and includes the passages (5) for the nutrients (FIG. 27).

Figure 28:
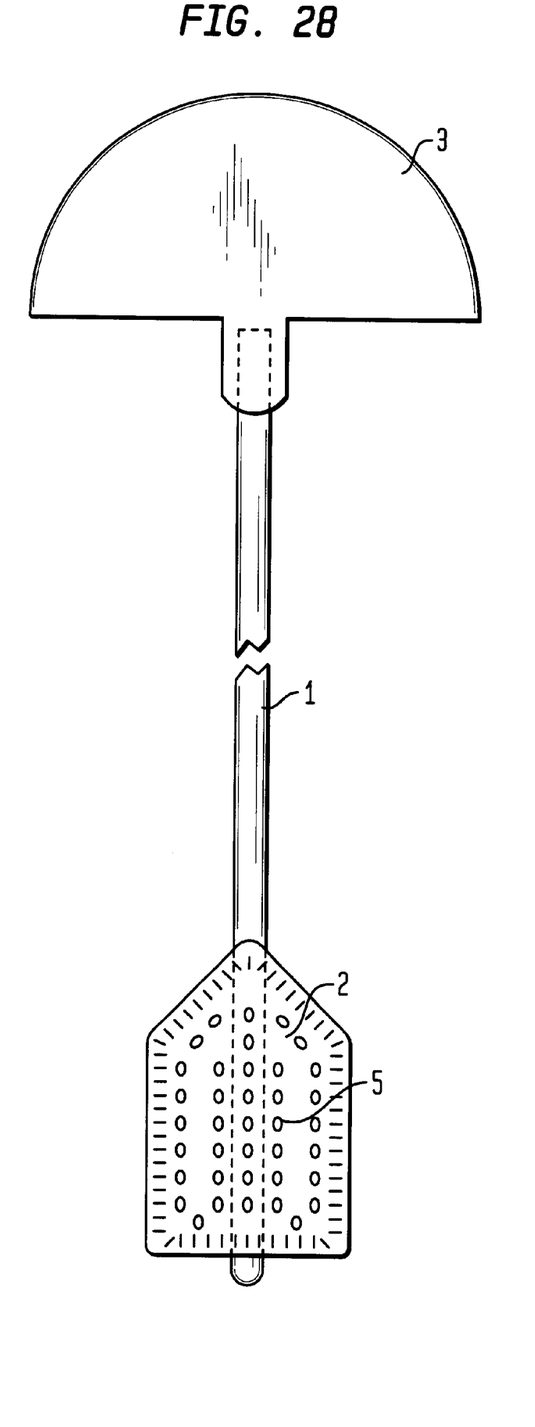
FIG. 28 shows an embodiment in which the carrier is guided between two pockets of a container.

FIG. 28 shows again the complete configuration of the device according to the invention, that is the container 2, attached to the carrier 1, as well as the top piece 3 which may be a dedication carrier, a greeting card, a figurine, a gift container, e.g. for a piece of jewelry, a perfume flask, twinkle candles, or the like. The container 2 is configured like a tea bag, with the wall of the container being formed by a porous nonwoven through which the nutrients can be leached from the inside of the container.

Figure 29:
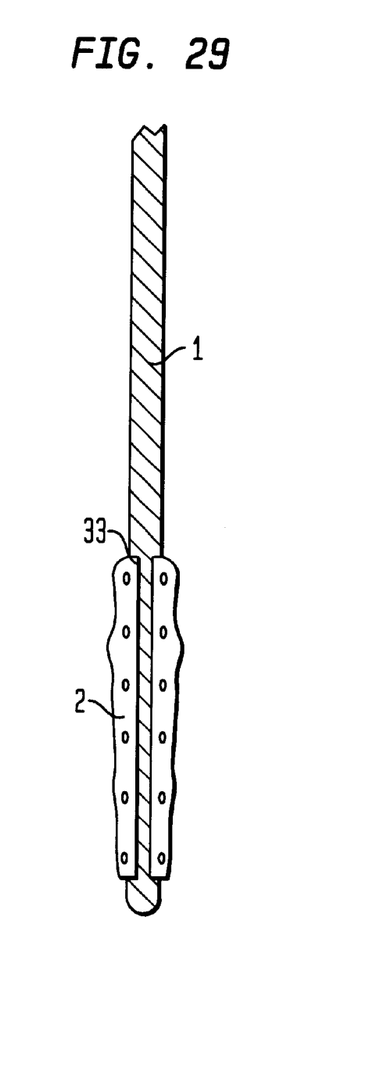
FIG. 29 shows in detail the securement of the container to carriers.

FIG. 29 shows finally, in detail, a further variation in which the carrier 1 is provided in the region of the container 2 with flattened areas 33 in order to ensure a secure restraint of the container 2 formed as small bag.

Figure 35:
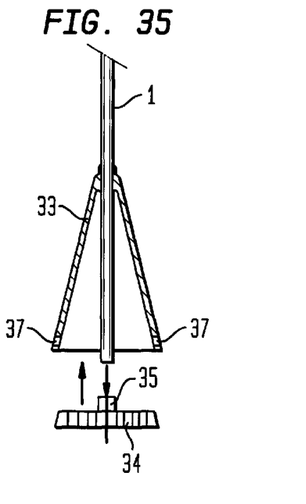
FIG. 35 is a vertical section through a cone-shaped container, with the individual components depicted in an exploded view, and arrows indicating in which manner the container is closed after charging the keep-fresh substances.

In the embodiments of FIGS. 30 to 34, the container has a jacket 33 which is tapered upwardly and in which a terminal plate is inserted from below. FIG. 35 illustrates the assembly of a container according to FIG. 31, with the blade-shaped, stem-shaped, stalked-shaped or rod-shaped carrier 1 entering in the region of the tip of the container through the container and is secured at its lower end to the terminal plate 34, e. g. through insertion in a receptacle 35. In the embodiments according to FIGS. 30 to 34, a separate guide 36 is provided for the carrier 1 at the upper part.

Figure 30:
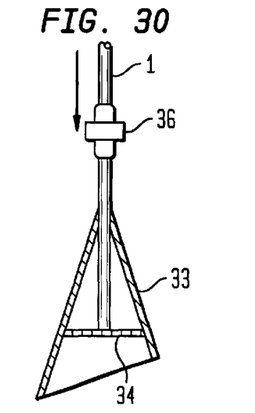
FIG. 30 is a vertical section of a further variation in which the bottom of the container is pressed outward from its mounting in the housing.
Figure 31:
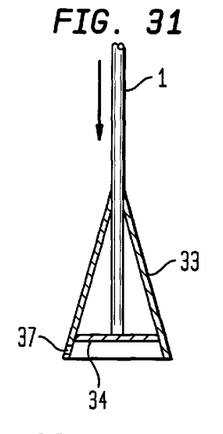
FIG. 31 shows an illustration analogous to FIG. 30, however with slightly altered outer cone.
Figures 32, 33:
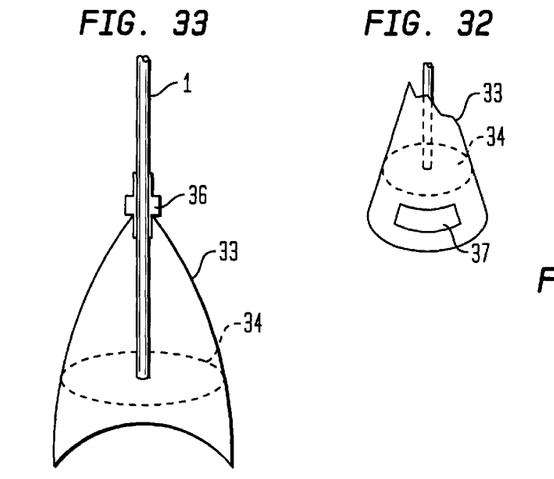
FIG. 32 is a perspective view of the design of FIG. 31, partially cut away.
FIG. 33 is a schematic illustration analogous to FIG. 30, however with different outer contour of the container.
Figure 34:
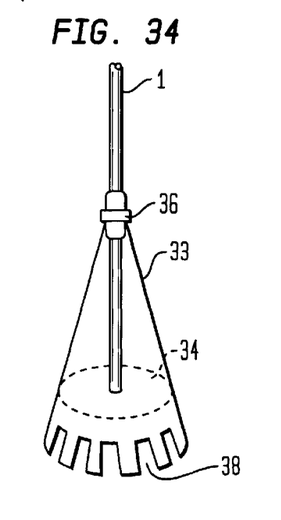
FIG. 34 shows schematically another embodiment in which the lower edge of the cone-shaped container is serrated in order to provide entry options of the keep-fresh liquid into the interior of the container.

In order to permit a release of the preservation substance into the keep-fresh liquid, the lower edge of the container 33 is cut obliquely according to FIG. 30. In FIG. 31, the part located below the terminal plate is provided with through-openings 37 through which the keep-fresh liquid can come in contact with the keep-fresh substance when placing the container 33 on the bottom. In the exemplified embodiment of FIG. 33, the lower edge of the container 33 is arched, or serrated as in FIG. 34. These prongs have then also passages 38 which permit the entry of keep-fresh liquid into the container, and thus a washing out of the preservation substance.

Figure 36:
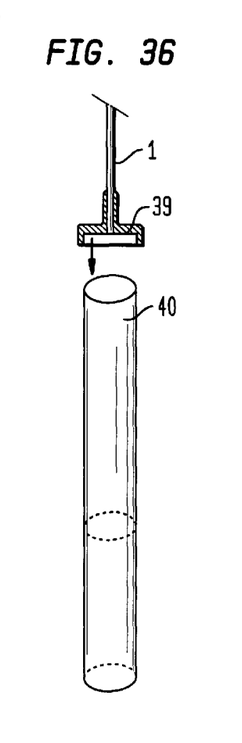
FIG. 36 shows the lower part of the stem-shaped carrier which is provided with a retention member for a fertilizer body.

According to FIG. 36, the lower end of the carrier 1 is provided with a cap 39 in which a fertilizer carrier 40 is insertable that is self-carrying and may be, optionally, coated with a means that have a retard effect.

Figure 37:
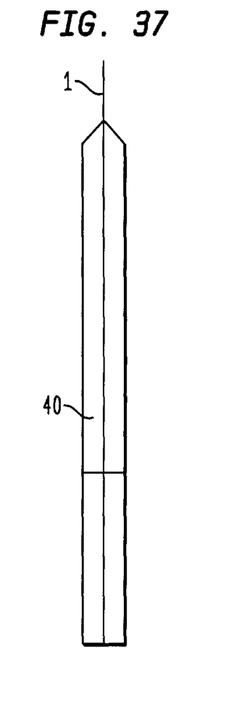
FIG. 37 shows a schematic side view of a further variation of a fertilizer body which is suspended from a wire or similar carrier.

FIG. 37 shows a variation analogous to FIG. 36, however with the carrier 1 being formed as a thin element which traverses the entire fertilizer carrier 40 and is surrounded by the latter.

Figure 38:
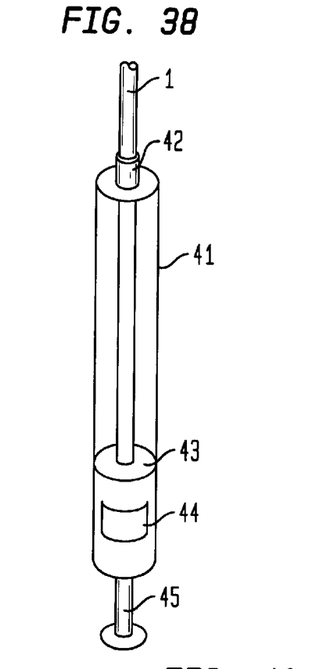
FIG. 38 is a perspective view of a further variation in which the container is supported by a spacer from the bottom.
Figure 40:
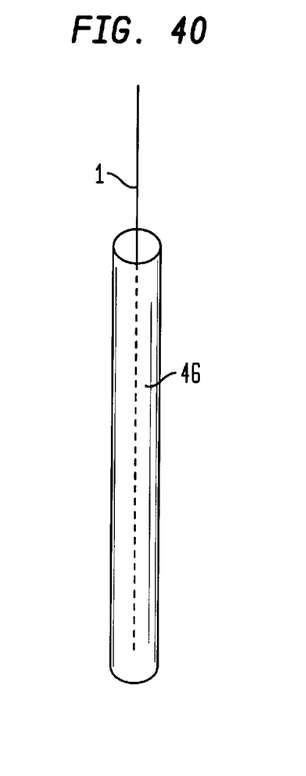
FIG. 40 shows a particularly simple embodiment in which a fertilizer carrier is fastened to a wire.

FIG. 38 shows a cylindrical container 41 having on its upper end a guide 42 for the carrier 1 which is provided at its free end with a piston 43 that slides tightly in the cylindrical container 41. The cylindrical wall of the container 41 is provided at the lower end with an opening 44 via which the keep-fresh substance can be pushed out by means of the piston. This opening 44 can be temporarily closed, so that the pressure exerted by the piston ruptures the closure and thereby releases the substance. It may also be possible to provide a water-soluble film or the like as closure, which then dissolves in water and releases the preserving substance into the liquid when the piston 43 is pressed down. At its lower end, the container 41 is provided with a foot 45 which is supported by the bottom, so that the entire keep-fresh substance is prevented from being released only in the bottom area of the liquid, and distributed in the container. The latter may be improved by the addition of gas-forming substances, for example bubbling powder. FIG. 40 shows a design analogous to FIG. 37, with the container 46 being formed by a small paper roll or the like.

Figure 39:
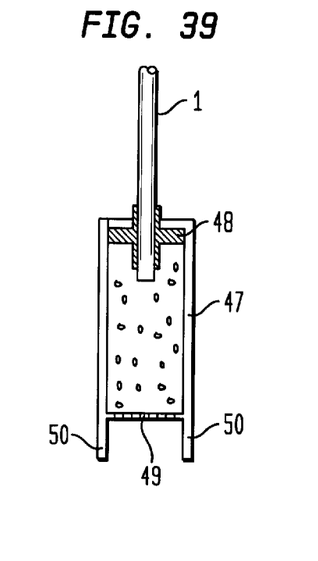
FIG. 39 is a cross sectional view of an embodiment in which the keep-fresh substances are expelled from the container by a piston.

FIG. 39 depicts again a cylindrical container 47, in which a piston is slidably arranged for support of the blade-shaped, stem-shaped, stalk-shaped or rod-shaped carrier 1. At the lower end, the container 47 is closed by a perforated wall 49 and is supported by the bottom via projections 50. Thus, when the piston 48 is pressed down, the contained keep-fresh substances can be released through the pores of the plate 49 into the keep-fresh liquid and mixed therein.

Figure 41:
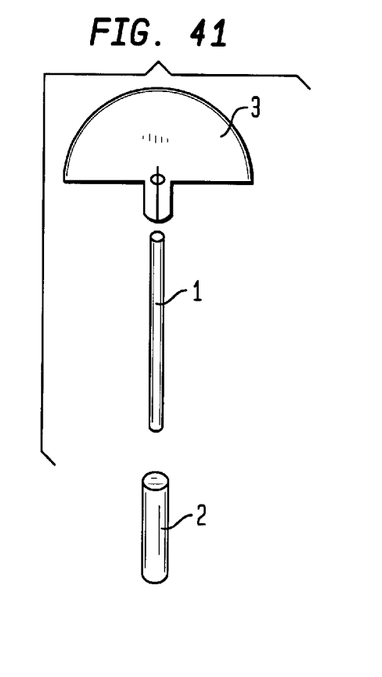
FIG. 41 shows finally a schematic view of individual parts of the subject matter of the invention prior to assembly, that is the blade-shaped, stem-shaped, stalk-shaped or rod-shaped carrier with a top piece and a container for fertilizer.

FIG. 41 shows again, on an enlarged scale, an exploded illustration of the overall configuration of the subject matter of the invention, which includes a blade-shaped, stem-shaped, stalk-shaped, or rod-shaped carrier 1, a container generally designated here by 2 for a fertilizer, and a top piece generally designated here with by 3. It is understood that the container 2 is exchangeable with any of the afore-described and discussed containers, and this applies likewise to the top piece 3 which may serve as a gift receptacle or the like.

In all variations, the nutrient composition used may be in solid, powdery, grainy or liquid form, whereby in all non-liquid compositions a physiologically inert propellant, for example a $CO_2$-releasing propellant may be additionally admixed to the nutrients. The effect of the propellant is to build up a gas pressure in the container when the container is immersed in the keep-fresh liquid for expelling the nutrient solution quickly from the container into the liquid and realizing a rapid distribution of the nutrients in the liquid as a consequence of the circulation caused by the propellant. Thus, local concentration peaks in the liquid are avoided as such peaks may be harmful to the flowers.

In summary, the device according to the invention has the purpose that the blade-shaped, stem-shaped, stalk-shaped or rod-shaped carrier 1 can be directly integrated in the flower bouquet so that, after optional detachment or displacement of the covering 6 when the flowers are placed in water, the required nutrients are automatically added to the cut flowers, thereby ensuring an extended preservation of the flowers. Also handling of the device according to the invention is very simple since the various embodiments allow selection, depending of the type of flower, of those containers 2 which contain the correct nutrient composition, while still being able to take into account the speed by which the nutrients are released, or the needed profile. These containers are then secured to the carrier 1, and this carrier is then bound with the individual flowers into the bouquet. For special occasions, the top side of the carrier may have inserted thereon a dedication carrier (3), a greeting card, a figurine, a gift container, a perfume flask, twinkle candles or the like.

What is claimed is:

1. A device for keeping a bouquet of flowers fresh when the flowers are placed in a keep-fresh liquid, said device comprising a carrier adapted for integration in the flower bouquet, said carrier capable of releasing nutrients directly to the liquid into which the flower bouquet has been finally placed, said carrier having a configuration selected from the group consisting of blade-shape, stem-shape, stalk-shape and rod-shape, and including a container which receives and releases the nutrients and has walls which are permeable at least in a certain area; wherein the walls of the container have formed therein one or more perforations for permeability of the container, and further comprising a covering for masking the one or more perforations before the flower bouquet is placed in the liquid.

2. The device of claim 1, wherein the container has a shape selected from the group consisting of cylindrical shape and prismatic shape, said covering being a sleeve enveloping the container and destined for displacement in axial direction.

3. The device of claim 1, wherein the container has a shape selected from the group consisting of cylindrical shape and prismatic shape, said covering being a detachable film which envelopes the container.

4. The device of claim 1, wherein the covering is made of a material which is soluble or decomposable in water.

5. The device of claim 4, wherein the material for the covering is soluble or decomposable in a time-delayed manner.

6. The device of claim 1, wherein the nutrients have a composition selected from the group consisting of liquid consistency, powdery consistency and solid consistency.

7. The device of claim 1, wherein the carrier and the container form separate parts, with the container being securable to the carrier.

8. A device for keeping a bouquet of flowers fresh when the flowers are placed in a keep-fresh liquid, said device comprising a carrier adapted for integration in the flower bouquet, said carrier capable of releasing nutrients directly to the liquid into which the flower bouquet has been finally placed, said carrier having a configuration selected from the group consisting of blade-shape, stem-shape, stalk-shape and rod-shape, and including a container which receives and releases the nutrients and has walls which are permeable at least in a certain area; and further comprising a physiologically inert propellant admixed to the nutrients.

9. The device of claim 8 wherein the propellant is a $CO_2$-releasing substance.

10. A device for keeping a bouquet of flowers fresh when the flowers are placed in a keep-fresh liquid, said device comprising a carrier adapted for integration in the flower bouquet, said carrier capable of releasing nutrients directly to the liquid into which the flower bouquet has been finally placed, said carrier having a configuration selected from the group consisting of blade-shape, stem-shape, stalk-shape and rod-shape, and including a container which receives and releases the nutrients and has walls which are permeable at least in a certain area; wherein the container is made of a material selected from the group consisting of flexible, permeable material, non-woven fabric, and perforated film, said container being wrapped around the carrier.

11. The device of claim 10, wherein the flexible, permeable material is paper.

12. The device of claim 10, wherein the carrier is provided in the region of the container with ridges or flattened areas.

13. The device of claim 10, wherein the container is formed as a cylinder having an upper end surface formed as a piston which is connected to the carrier.

14. The device of claim 10, wherein the carrier has an upper end adapted for receiving one selected from the group consisting of a dedication carrier, a greeting card, a figurine, a gift container.

15. A device for keeping a bouquet of flowers fresh when the flowers are placed in a keep-fresh liquid, said device comprising a carrier adapted for integration in the flower bouquet, said carrier capable of releasing nutrients directly to the liquid into which the flower bouquet has been finally placed, said carrier having a configuration selected from the group consisting of blade-shape, stem-shape, stalk-shape and rod-shape, and including a container which receives and releases the nutrients and has walls which are permeable at least in a certain area; and wherein the container is formed as a cylinder having an upper end surface formed as a piston which is connected to the carrier which forms a piston rod for the piston.

16. A device for keeping a bouquet of flowers fresh when the flowers are placed in a keep-fresh liquid, said device comprising a carrier adapted for integration in the flower bouquet, said carrier capable of releasing nutrients directly to the liquid into which the flower bouquet has been finally placed, said carrier having a configuration selected from the group consisting of blade-shape, stem-shape, stalk-shape and rod-shape, and including a container which receives and releases the nutrients and has walls which are permeable at least in a certain area; wherein the walls of the container have formed therein one or more perforations for permeability of the container, and further comprising a covering for masking the one or more perforations before the flower bouquet is placed in the liquid; and wherein the container has a shape selected from the group consisting of cylindrical shape, prismatic shape and truncated cone shape, said container having a lower end formed with a delivery opening, said lower end of the container having a configuration selected from the group consisting of oblique shape, serrated shape and corrugated shape.

17. A device for keeping a bouquet of flowers fresh when the flowers are placed in a keep-fresh liquid, said device comprising a carrier adapted for integration in the flower bouquet, said carrier capable of releasing nutrients directly to the liquid into which the flower bouquet has been finally placed, said carrier having a configuration selected from the group consisting of blade-shape, stem-shape, stalk-shape and rod-shape, and including a container which receives and releases the nutrients and has walls which are permeable at least in a certain area; wherein the walls of the container have formed therein one or more perforations for permeability of the container, and further comprising a covering for masking the one or more perforations before the flower bouquet is placed in the liquid; and further comprising a snap-on lid for attachment atop of the container, said carrier being rod-shaped and received in the lid and guided therein in longitudinal direction.

\* \* \* \* \*